US011923165B2

(12) United States Patent
Matsuura

(10) Patent No.: US 11,923,165 B2
(45) Date of Patent: Mar. 5, 2024

(54) RADIATION TUBE AND RADIATION SOURCE

(71) Applicant: FUJIFILM CORPORATION, Tokyo (JP)

(72) Inventor: Masayoshi Matsuura, Kanagawa (JP)

(73) Assignee: FUJIFILM CORPORATION, Tokyo (JP)

( * ) Notice: Subject to any disclaimer, the term of this patent is extended or adjusted under 35 U.S.C. 154(b) by 0 days.

(21) Appl. No.: 17/673,735

(22) Filed: Feb. 16, 2022

(65) Prior Publication Data

US 2022/0285121 A1 Sep. 8, 2022

(30) Foreign Application Priority Data

Mar. 3, 2021 (JP) ................................ 2021-033834

(51) Int. Cl.

| | |
|---|---|
| ***H01J 35/02*** | (2006.01) |
| ***H05G 1/08*** | (2006.01) |
| ***H05G 1/12*** | (2006.01) |
| ***H05G 1/32*** | (2006.01) |
| ***H05G 1/34*** | (2006.01) |
| *H01J 35/06* | (2006.01) |
| *H01J 35/08* | (2006.01) |
| *H01J 35/16* | (2006.01) |

(52) U.S. Cl.

CPC .......... *H01J 35/025* (2013.01); *H05G 1/085* (2013.01); *H05G 1/12* (2013.01); *H05G 1/32* (2013.01); *H05G 1/34* (2013.01); *H01J 35/065* (2013.01); *H01J 35/08* (2013.01); *H01J 35/16* (2013.01)

(58) Field of Classification Search

CPC ...... H01J 35/025; H01J 35/065; H05G 1/085; H05G 1/12; H05G 1/32; H05G 1/34

See application file for complete search history.

(56) References Cited

U.S. PATENT DOCUMENTS 5,121,317 A * 6/1992 Vogler .................... H05G 1/20 363/136

5,731,968 A * 3/1998 Van Der Broeck ...... H05G 1/20 378/111

(Continued)

FOREIGN PATENT DOCUMENTS

JP 2012-033411 A 2/2012

OTHER PUBLICATIONS

Anonymous: "Warum ist 5,1 V die Standard-Zenerspannung und nicht 5 V?", Jul. 1, 2022, Retrieved from the Internet: URL: https://qastack.com.de/electronics/311062/why-is-5-1v-the-standard-zener-voltage-and-not-5v.

(Continued)

*Primary Examiner* — Chih-Cheng Kao

(74) *Attorney, Agent, or Firm* — SOLARIS Intellectual Property Group, PLLC

(57) ABSTRACT

A radiation tube that is used in a radiation source for radiography includes: an electron emitting unit that includes a cathode unit having an emitter electrode which emits electrons and a gate electrode; an anode unit that has an anode surface facing the cathode unit and collides with the electrons to generate radiation; a constant voltage supply unit that supplies a constant driving voltage to the gate electrode; and a vacuum tube that accommodates the constant voltage supply unit, the electron emitting unit, and the anode unit.

9 Claims, 5 Drawing Sheets

(56) References Cited

U.S. PATENT DOCUMENTS

| | | | | |
|---|---|---|---|---|
| 2003/0142790 | A1* | 7/2003 | Zhou .................... | A61B 6/4028 378/119 |
| 2009/0010393 | A1 | 1/2009 | Klinkowstein et al. | |
| 2009/0257560 | A1* | 10/2009 | Khutoryansky ......... | H05G 1/10 29/606 |
| 2012/0207269 | A1* | 8/2012 | Behling .................. | H01J 35/04 977/949 |
| 2015/0371809 | A1* | 12/2015 | Ding ........................ | H05G 1/12 378/101 |
| 2017/0135189 | A1* | 5/2017 | Jeong ....................... | A61B 6/00 |

OTHER PUBLICATIONS

Extended European Search Report dated Jul. 12, 2022, issued in corresponding EP Patent Application No. 22158547.4.

* cited by examiner

RADIATION TUBE AND RADIATION SOURCE

CROSS-REFERENCE TO RELATED APPLICATIONS

The present application claims priority under 35 U.S.C. § 119 to Japanese Patent Application No. 2021-033834 filed on Mar. 3, 2021. The above application is hereby expressly incorporated by reference, in its entirety, into the present application.

BACKGROUND

1. Technical Field

The present disclosure relates to a radiation tube and a radiation source.

2. Description of the Related Art

A radiation source is known which emits radiation to an object in a case in which a radiographic image of the object is captured. The radiation source includes a radiation tube that generates radiation. As the radiation tube, in addition to a radiation tube that heats a filament as an electrode to emit thermal electrons, a radiation tube comprising a cold cathode that emits electrons without heating the electrode is known. The radiation tube comprises: an electron emitting unit that includes a cathode unit and a gate electrode for applying a voltage to the cathode unit and constitutes a cold cathode; an anode unit that has an anode surface facing the cathode unit; and a constant voltage supply unit that supplies a constant driving voltage to the gate electrode (see, for example, JP2012-33411A). In the radiation tube disclosed in JP2012-33411A, the electron emitting unit and the anode unit are accommodated in a vacuum tube, and the constant voltage supply unit is provided outside the vacuum tube.

SUMMARY

The radiation source comprises a housing that accommodates the radiation tube. In a case in which the constant voltage supply unit is provided outside the vacuum tube of the radiation tube and inside the housing, since an outer wall of the housing has a ground potential, a sufficient distance is required between the constant voltage supply unit and the outer wall of the housing. For example, it is necessary to provide a constant voltage substrate on which the constant voltage supply unit is formed and the outer wall of the housing so as to be sufficiently separated from each other. Therefore, in the technique according to the related art, it is necessary to increase the size of the housing. Therefore, there is a problem that the overall size of the radiation source is relatively large.

There is a demand for reducing the size of a radiography apparatus. In particular, there is a strong demand for reducing the size of a radiation source in a case in which a movement mechanism for moving the radiation source is provided.

The present disclosure has been made in view of the above circumstances, and an object of the present disclosure is to provide a radiation tube and a radiation source that have a smaller size than those in the related art.

In order to achieve the above object, according to a first aspect of the present disclosure, there is provided a radiation tube that is used in a radiation source for radiography. The radiation tube comprises: an electron emitting unit that includes a cathode unit having an emitter electrode which emits electrons and a gate electrode; an anode unit that has an anode surface facing the cathode unit and collides with the electrons to generate radiation; a constant voltage supply unit that supplies a constant driving voltage to the gate electrode; and a vacuum tube that accommodates the electron emitting unit, the anode unit, and the constant voltage supply unit.

According to a second aspect of the present disclosure, in the radiation tube according to the first aspect, the constant voltage supply unit may include a Zener diode that is connected in parallel to the gate electrode and the cathode unit and a smoothing capacitor that is connected in parallel to the Zener diode.

According to a third aspect of the present disclosure, in the radiation tube according to the second aspect, the constant voltage supply unit may further include a temperature compensation diode that is connected in series to the Zener diode.

According to a fourth aspect of the present disclosure, in the radiation tube according to the second aspect or the third aspect, at least the Zener diode of the constant voltage supply unit may be mounted on the same substrate as the electron emitting unit.

According to a fifth aspect of the present disclosure, in the radiation tube according to any one of the first to third aspects, a constant voltage substrate on which the constant voltage supply unit is formed may be disposed to come into contact with an electron emitting unit substrate on which the electron emitting unit is formed.

According to a sixth aspect of the present disclosure, in the radiation tube according to any one of the first to third aspects, a constant voltage substrate on which the constant voltage supply unit is formed may be disposed to be separated from an electron emitting unit substrate on which the electron emitting unit is formed.

According to a seventh aspect of the present disclosure, there is provided a radiation source comprising: the radiation tube according to the present disclosure; an anode-side booster circuit unit that is provided outside a vacuum tube of the radiation tube and supplies a boosted anode voltage to the anode unit; and a cathode-side booster circuit unit that is provided outside the vacuum tube and supplies a boosted cathode voltage to the cathode unit.

According to an eighth aspect of the present disclosure, in the radiation source according to the seventh aspect, a driving voltage boosted by the cathode-side booster circuit unit may be higher than a power supply voltage boosted by the anode-side booster circuit unit.

According to a ninth aspect of the present disclosure, in the radiation source according to the eighth aspect, the anode-side booster circuit unit may include an anode transformer, and the cathode-side booster circuit unit may include a cathode transformer that has a higher ratio of the number of turns of a secondary coil to the number of turns of a primary coil than the anode transformer.

According to a tenth aspect of the present disclosure, in the radiation source according to the eighth aspect or the ninth aspect, the anode-side booster circuit unit may include an anode capacitor that accumulates charge corresponding to the boosted power supply voltage, and the cathode-side booster circuit unit may include a cathode capacitor that accumulates charge corresponding to the boosted driving voltage and has a higher capacitance than the anode capacitor.

According to an eleventh aspect of the present disclosure, the radiation source according to any one of the seventh to tenth aspects may further comprise a housing that accommodates the radiation tube.

According to the present disclosure, the radiation source comprising the radiation tube can have a smaller size than that in the related art.

BRIEF DESCRIPTION OF THE DRAWINGS

Exemplary embodiments according to the technique of the present disclosure will be described in detail based on the following figures, wherein.

DETAILED DESCRIPTION

Hereinafter, an embodiment of the present disclosure will be described in detail with reference to the drawings. In addition, this embodiment does not limit the present disclosure.

Figure 1:
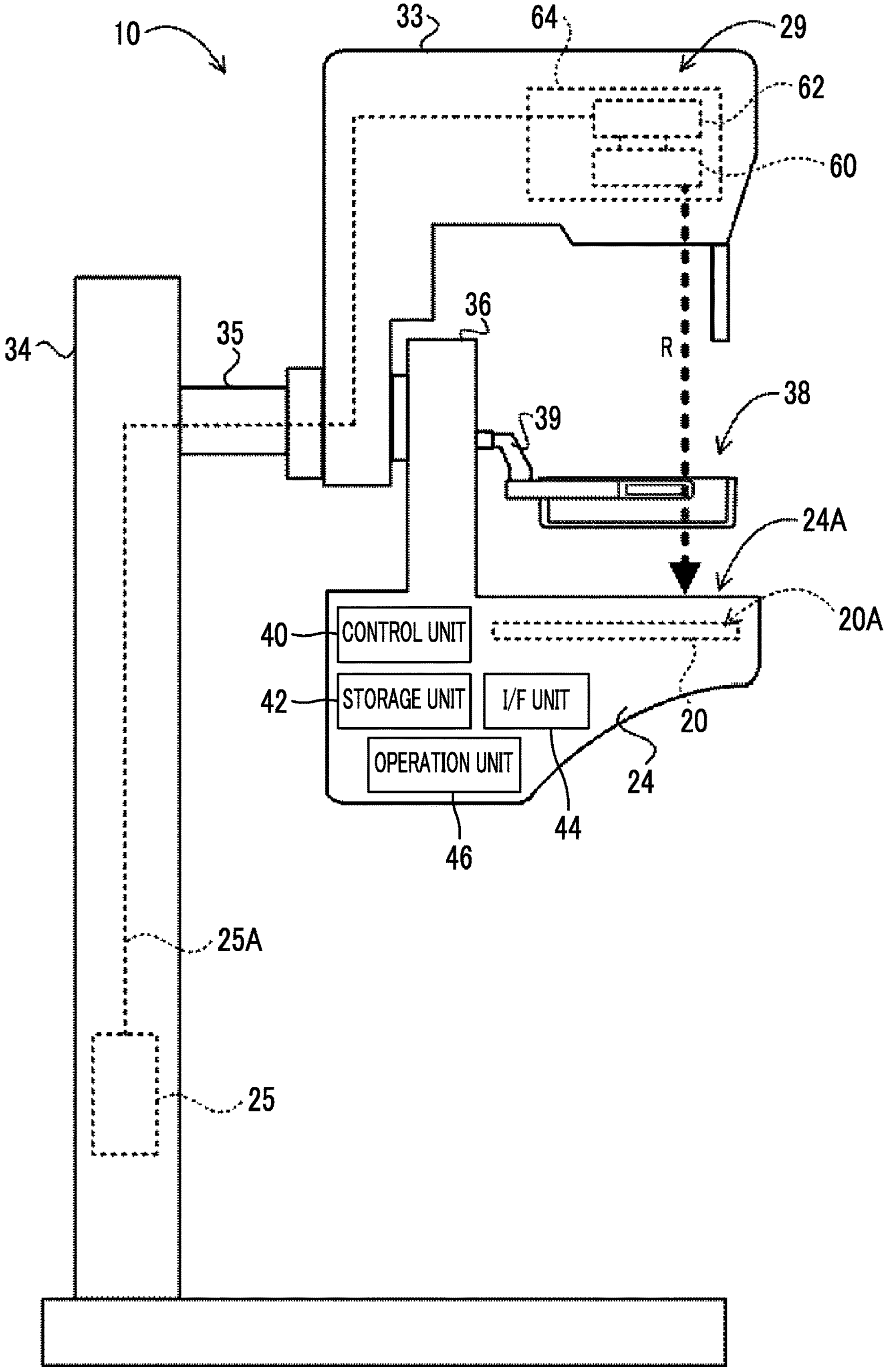
FIG. 1 is a side view illustrating an example of the outward appearance of a mammography apparatus according to an embodiment.

First, an example of the configuration of a mammography apparatus according to this embodiment will be described. FIG. 1 is a side view illustrating an example of the outward appearance of a mammography apparatus 10 according to this embodiment. In addition, FIG. 1 illustrates an example of the outward appearance of the mammography apparatus 10 as viewed from the left side of a subject.

The mammography apparatus 10 according to this embodiment is an apparatus that is operated under the control of a console (not illustrated) and irradiates a breast of the subject as an object with radiation R (for example, X-rays) to capture a radiographic image of the breast. In addition, the mammography apparatus 10 may be an apparatus that images the breast of the subject not only in a state in which the subject is standing (standing state) but also in a state in which the subject is sitting on, for example, a chair (including a wheelchair) (sitting state).

As illustrated in FIG. 1, the mammography apparatus 10 according to this embodiment comprises a control unit 40, a storage unit 42, and an interface (I/F) unit 44 which are provided in an imaging table 24. The control unit 40 controls the overall operation of the mammography apparatus 10 under the control of the console. The control unit 40 comprises a central processing unit (CPU), a read only memory (ROM), and a random access memory (RAM) which are not illustrated. For example, various programs including an imaging processing program which is executed by the CPU and is used to perform control related to the capture of radiographic images are stored in the ROM in advance. The RAM temporarily stores various kinds of data.

For example, image data of a radiographic image captured by a radiation detector 20 and various other kinds of information are stored in the storage unit 42. A specific example of the storage unit 42 is a hard disk drive (HDD), a solid state drive (SSD), or the like. The I/F unit 44 transmits and receives various kinds of information to and from the console using wireless communication or wired communication. The image data of the radiographic image captured by the radiation detector 20 in the mammography apparatus 10 is transmitted to an external device, such as the console, through the I/F unit 44 by wireless communication or wired communication.

In addition, the operation unit 46 is, for example, a plurality of switches that are provided in the imaging table 24 of the mammography apparatus 10 or the like. Further, the operation unit 46 may be provided as a touch panel switch or may be provided as a foot switch that is operated by the feet of the user such as a doctor or a radiology technician.

As illustrated in FIG. 1, the radiation detector 20 is disposed in the imaging table 24. In the mammography apparatus 10 according to this embodiment, in a case in which imaging is performed, the breast of the subject is positioned on an imaging surface 24A of the imaging table 24 by a user.

The radiation detector 20 detects the radiation R transmitted through the breast which is the object. Specifically, the radiation detector 20 detects the radiation R that has entered the breast of the subject and an imaging table 24 and reached the detection surface 20A of the radiation detector 20, generates a radiographic image on the basis of the detected radiation R, and outputs image data indicating the generated radiographic image. The type of the radiation detector 20 according to this embodiment is not particularly limited. For example, the radiation detector 20 may be an indirect-conversion-type radiation detector that converts the radiation R into light and converts the converted light into charge or a direct-conversion-type radiation detector that directly converts the radiation R into charge.

A compression plate 38 that is used to compress the breast in a case in which imaging is performed is attached to a compression unit 36 that is provided in the imaging table 24. Specifically, the compression unit 36 is provided with a compression plate driving unit (not illustrated) that moves the compression plate 38 in a direction (hereinafter, referred to as an "up-down direction") toward or away from the imaging table 24. A support portion 39 of the compression plate 38 is detachably attached to the compression plate driving unit and is moved in the up-down direction by the compression plate driving unit to compress the breast of the subject between the compression plate 38 and the imaging table 24.

Furthermore, as illustrated in FIG. 1, the mammography apparatus 10 according to this embodiment comprises the imaging table 24, the arm portion 33, a base 34, and a shaft portion 35. The arm portion 33 is held by the base 34 so as to be movable in the up-down direction (Z-axis direction). In addition, the arm portion 33 can be rotated with respect to the base 34 by the shaft portion 35. The shaft portion 35 is fixed to the base 34, and the shaft portion 35 and the arm portion 33 are rotated integrally.

Gears are provided in each of the shaft portion 35 and the compression unit 36 of the imaging table 24. The gears can be switched between an engaged state and a non-engaged state to switch between a state in which the compression unit 36 of the imaging table 24 and the shaft portion 35 are connected and rotated integrally and a state in which the shaft portion 35 is separated from the imaging table 24 and runs idle. In addition, components for switching between the transmission and non-transmission of the power of the shaft portion 35 are not limited to the gears, and various mechanical elements may be used.

Each of the arm portion 33 and the imaging table 24 can be relatively rotated with respect to the base 34, using the shaft portion 35 as a rotation axis. In this embodiment, engagement portions (not illustrated) are provided in each of the base 34, the arm portion 33, and the compression unit 36 of the imaging table 24. The state of the engagement portions is switched to connect each of the arm portion 33 and the compression unit 36 of the imaging table 24 to the base 34. One or both of the arm portion 33 and the imaging table 24 connected to the shaft portion 35 are integrally rotated on the shaft portion 35. The mammography apparatus 10 can perform simple imaging that captures an image of an object in a posture in which a radiation source 29 faces the radiation detector 20 and can also perform so-called tomosynthesis imaging that captures images a plurality of times while relatively moving the radiation source 29 with respect to the radiation detector 20 to change the irradiation angle of the radiation R with respect to the object. In a case in which the tomosynthesis imaging is performed in the mammography apparatus 10, the radiation source 29 is moved to each of a plurality of irradiation positions having different irradiation angles by the rotation of the arm portion 33.

Figure 2:
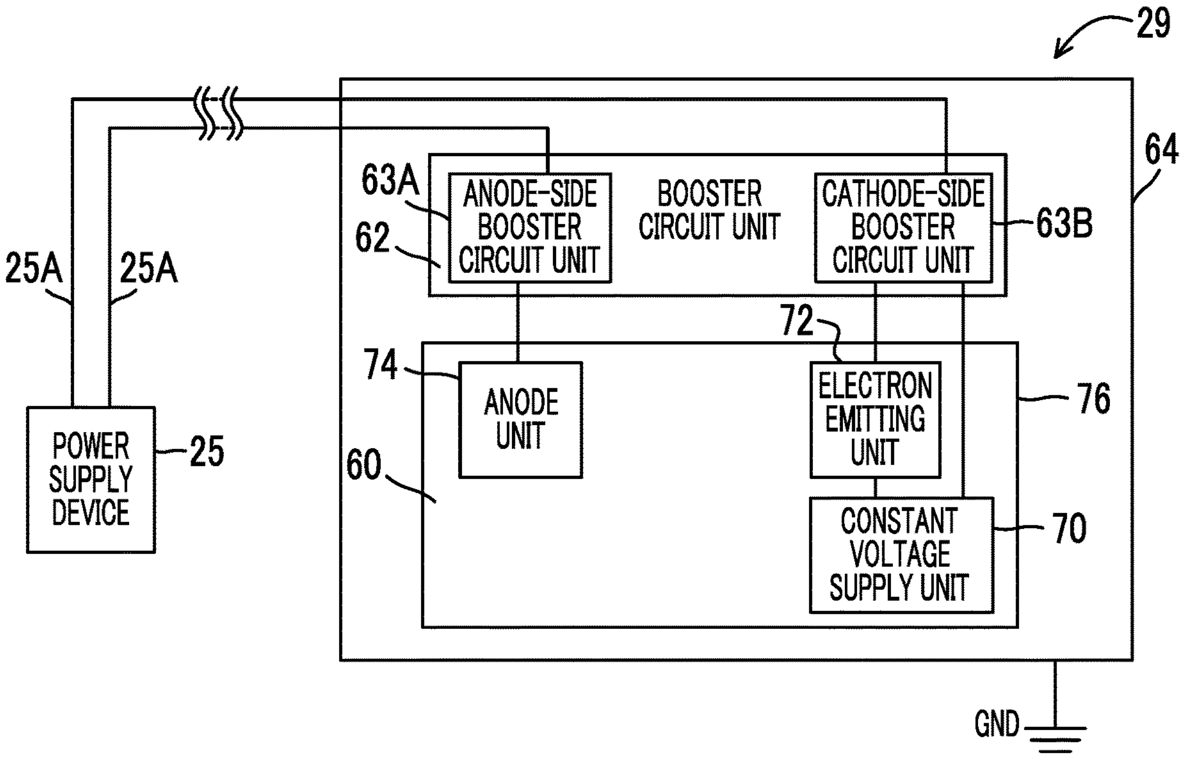
FIG. 2 is a block diagram illustrating an example of a configuration of a radiation source according to the embodiment.

The radiation source 29 generates the radiation R under the control of the control unit 40 and emits the generated radiation R to the object. FIG. 2 is a block diagram illustrating an example of the configuration of the radiation source 29 according to this embodiment. As illustrated in FIG. 2, the radiation source 29 comprises a radiation tube 60, a booster circuit unit 62, and a housing 64. The housing 64 is connected to the ground potential GND and accommodates the radiation tube 60 and the booster circuit unit 62.

As illustrated in FIGS. 1 and 2, a predetermined voltage is supplied to the booster circuit unit 62 from a power supply device 25 that is provided in the base 34 through a voltage cable 25A. The booster circuit unit 62 has a function of boosting the predetermined voltage supplied from the power supply device 25 through the voltage cable 25A and supplying the boosted voltage to the radiation tube 60.

The booster circuit unit 62 includes an anode-side booster circuit unit 63A and a cathode-side booster circuit unit 63B. The anode-side booster circuit unit 63A is provided outside a vacuum tube 76 of the radiation tube 60 and supplies a boosted anode voltage to an anode unit 74 of the radiation tube 60. Specifically, the anode-side booster circuit unit 63A boosts the voltage supplied from the power supply device 25 through the voltage cable 25A and supplies the boosted voltage as the anode voltage to the anode unit 74 of the radiation tube 60. On the other hand, the cathode-side booster circuit unit 63B is provided outside the vacuum tube 76 of the radiation tube 60 and supplies a boosted cathode voltage to an electron emitting unit 72 of the radiation tube 60. Specifically, the cathode-side booster circuit unit 63B boosts the voltage supplied from the power supply device 25 through the voltage cable 25A and supplies the boosted voltage as the cathode voltage to the electron emitting unit 72 of the radiation tube 60.

The radiation tube 60 is used in the radiation source 29 for radiography and generates the radiation R according to the anode voltage and the cathode voltage supplied from the booster circuit unit 62. The radiation tube 60 comprises a constant voltage supply unit 70, the electron emitting unit 72, the anode unit 74, and the vacuum tube 76. The electron emitting unit 72 has a function of emitting electrons according to the cathode voltage supplied from the cathode-side booster circuit unit 63B. The constant voltage supply unit 70 has a function of supplying a constant driving voltage to a gate electrode 96 (see FIG. 3, which will be described in detail below) of the electron emitting unit 72. The anode unit 74 has a function of generating the radiation R using the electrons emitted by the electron emitting unit 72.

The vacuum tube 76 has a function of accommodating the constant voltage supply unit 70, the electron emitting unit 72, and the anode unit 74. The vacuum tube 76 has, for example, a cylindrical shape and is made of glass, ceramic, or the like. The inside of the vacuum tube 76 is hermetically sealed and is kept in a vacuum state.

Figure 3:
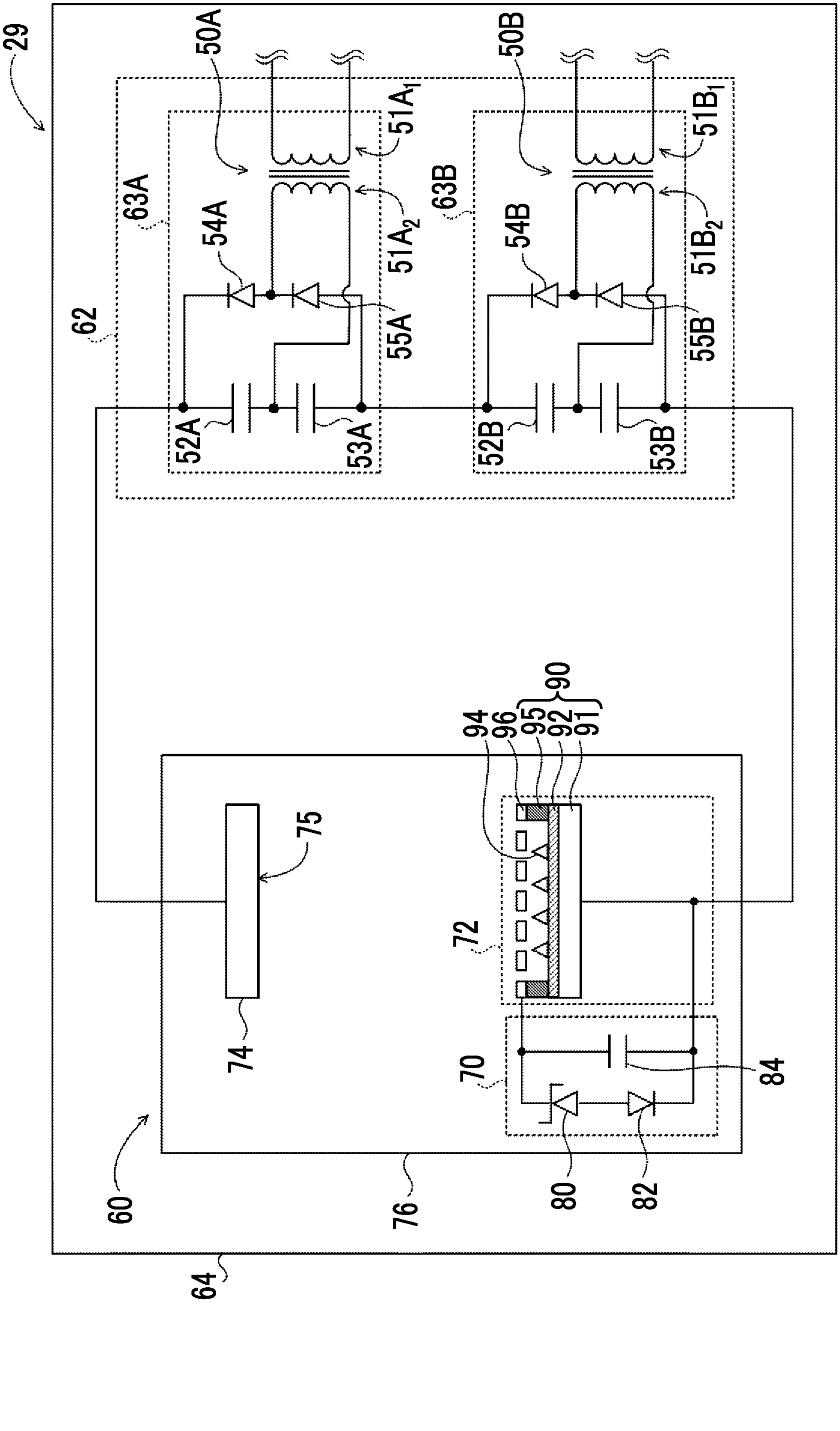
FIG. 3 is a diagram illustrating an example of a circuit configuration of a radiation tube and a booster circuit unit according to the embodiment.

The radiation source 29 according to this embodiment will be further described with reference to FIG. 3. FIG. 3 is a diagram illustrating an example of a circuit configuration of the radiation tube 60 and the booster circuit unit 62 according to this embodiment.

As illustrated in FIG. 3, the electron emitting unit 72 according to this embodiment has a cathode unit 90 and the gate electrode 96. The cathode unit 90 includes an emitter electrode 92 that has an electron emitting element 94 formed on a support substrate 91 made of, for example, silicon. For example, the emitter electrode 92 according to this embodiment is composed of a field emitter array in which a plurality of electron emitting elements 94 that emit electrons in a case in which an electric field is applied from the outside are arranged in a matrix. The electron emitting element 94 has, for example, a conical shape with a sharp tip. For example, an electron emitting element of the spinto-type emitter electrode 92 that is formed by the vapor deposition of molybdenum on the support substrate 91 is used.

The gate electrode 96 is an electrode for applying the electric field to the cathode unit 90. The gate electrode 96 is provided on the emitter electrode 92 through an insulation layer 95. The gate electrode 96 has a plurality of opening portions which are formed so as to surround each electron emitting element 94 and are arranged in a matrix so as to correspond to each electron emitting element 94. Electrons are emitted from the opening portions.

For example, a method for forming the gate electrode 96 and the cathode unit 90 is as follows. First, an oxide film which is a material forming the gate electrode 96 is formed on the support substrate 91, and a resist is formed on the oxide film according to a pattern of the gate electrode 96. After the resist is formed, the oxide film is etched to form an opening portion in the oxide film. A portion of the oxide film in which no resist is formed becomes the opening portion. After the opening portion is formed, a molybdenum film which is a material forming the electron emitting element 94 is formed by vapor deposition. Therefore, the emitter electrode 92 having the conical electron emitting element 94 formed in the opening portion is formed. In FIG. 3, the cathode unit 90 and the gate electrode 96 are drawn so as to be separated from each other. However, in practice, the cathode unit 90 and the gate electrode 96 are formed on one support substrate 91. For example, a carbon nanotube may be used as the material forming the electron emitting element 94. In other words, in this embodiment, the cathode unit 90 and the gate electrode 96 are formed as one chip.

Further, as illustrated in FIG. 3, the constant voltage supply unit 70 according to this embodiment includes a Zener diode 80, a temperature compensation diode 82, and a smoothing capacitor 84.

The Zener diode 80 is connected in parallel to the gate electrode 96 and the cathode unit 90. Specifically, in the Zener diode 80, a cathode is connected to the gate electrode 96, and an anode is connected to a wiring line for applying the cathode voltage to the cathode unit 90 through the temperature compensation diode 82. The Zener diode 80 has a function of making the voltage supplied to the gate electrode 96 constant even in a case in which a current flowing from the gate electrode 96 changes.

The temperature compensation diode 82 is connected in series to the Zener diode 80. The Zener diode 80 generates heat in a case in which a current flows from the gate electrode 96. Therefore, the temperature compensation diode 82 is a diode that is provided in a forward direction in order to cancel a temperature coefficient of the Zener diode 80. In addition, FIG. 3 illustrates an aspect in which one temperature compensation diode 82 is connected in series to the Zener diode 80. However, the number of temperature compensation diodes 82 provided is not limited to this aspect, and any number of temperature compensation diodes 82 may be provided according to the temperature coefficient of the Zener diode 80 as long as they can cancel the temperature coefficient.

Further, the smoothing capacitor 84 is connected in parallel to the Zener diode 80. The smoothing capacitor 84 has a function of suppressing voltage ripple between the gate electrode 96 and the cathode unit 90. Specifically, in a case in which the voltage is high, charge is accumulated in the smoothing capacitor 84. In a case in which the voltage is low, the accumulated charge is discharged to suppress the fluctuation of the voltage between the gate electrode 96 and the cathode unit 90.

Further, as illustrated in FIG. 3, the anode unit 74 has an anode surface 75 that faces the cathode unit 90. The electrons emitted from the electron emitting unit 72 collide with the anode surface 75, and the anode unit 74 generates the radiation R. The anode unit 74 is made of, for example, copper.

On the other hand, as illustrated in FIG. 3, the anode-side booster circuit unit 63A of the booster circuit unit 62 includes an anode transformer 50A which is a boosting transformer, diodes 54A and 55A, and capacitors 52A and 53A. The capacitor 52A and the capacitor 53A are connected in series between the anode unit 74 and the cathode-side booster circuit unit 63B. Specifically, one end of the capacitor 52A is connected to the anode unit 74, and the other end of the capacitor 52A is connected to one end of the capacitor 53A. The other end of the capacitor 53A is connected to the cathode-side booster circuit unit 63B. The capacitor 52A and the capacitor 53A according to this embodiment are an example of an anode transistor according to the present disclosure.

Further, the diode 54A and the diode 55A are connected in series to each other and are connected in parallel to the capacitor 52A and the capacitor 53A. Specifically, a cathode of the diode 54A is connected to the one end of the capacitor 52A, and an anode of the diode 54A is connected to a cathode of the diode 55A. An anode of the diode 55A is connected to the other end of the capacitor 53A.

Furthermore, the anode transformer 50A is a boosting transformer and includes a primary coil $51A_1$ that is connected to the power supply device 25 and a secondary coil $51A_2$ for supplying a voltage to the anode unit 74. The anode transformer 50A boosts the voltage supplied from the power supply device 25 to an anode voltage corresponding to the ratio of the number of turns of the secondary coil $51A_2$ to the number of turns of the primary coil $51A_1$. One end of the secondary coil $51A_2$ is connected to a midpoint of the diode 54A and the diode 55A. The other end of the secondary coil $51A_2$ is connected to a midpoint of the capacitor 52A and the capacitor 53A.

The anode-side booster circuit unit 63A boosts the voltage supplied from the power supply device 25 using the anode transformer 50A, rectifies and accumulates the voltage using the diodes 54A and 55A and the capacitors 52A and 53A, and supplies the anode voltage to the anode unit 74.

In addition, as illustrated in FIG. 3, the cathode-side booster circuit unit 63B of the booster circuit unit 62 has the same configuration as the anode-side booster circuit unit 63A. Specifically, the cathode-side booster circuit unit 63B has a cathode transformer 50B which is a boosting transformer, diodes 54B and 55B, and capacitors 52B and 53B. The capacitor 52B and the capacitor 53B are connected in series between the anode-side booster circuit unit 63A and the cathode unit 90. Specifically, one end of the capacitor 52B is connected to the anode-side booster circuit unit 63A, and the other end of the capacitor 52B is connected to one end of the capacitor 53B. The other end of the capacitor 53B is connected to the cathode unit 90. The capacitor 52B and the capacitor 53B according to this embodiment are an example of a cathode transistor according to the present disclosure.

Further, the diode 54B and the diode 55B are connected in series to each other and are connected in parallel to the capacitor 52B and the capacitor 53B. Specifically, a cathode of the diode 54B is connected to the one end of the capacitor 52B, and an anode of the diode 54B is connected to a cathode of the diode 55B. An anode of the diode 55B is connected to the other end of the capacitor 53B.

Furthermore, the cathode transformer 50B is a boosting transformer and includes a primary coil $51B_1$ that is connected to the power supply device 25 and a secondary coil $51B_2$ for supplying a voltage to the cathode unit 90. The cathode transformer 50B boosts the voltage supplied from the power supply device 25 to a cathode voltage corresponding to the ratio of the number of turns of the secondary coil $51B_2$ to the number of turns of the primary coil $51B_1$. One end of the secondary coil $51B_2$ is connected to a midpoint of the diode 54B and the diode 55B. The other end of the secondary coil $51B_2$ is connected to a midpoint of the capacitor 52B and the capacitor 53B. In this embodiment, the aspect in which the other end of the secondary coil $51B_2$ is connected to a midpoint of the capacitor 52B and the capacitor 53B has been described for ease of understanding. However, the other end of the secondary coil $51B_2$ does not necessarily have to be connected to the midpoint of the capacitor 52B and the capacitor 53B, and may be connected to parts with different potential differences (whichever may be larger).

The cathode-side booster circuit unit 63B boosts the voltage supplied from the power supply device 25 using the cathode transformer 50B, rectifies and accumulates the voltage using the diodes 54B and 55B and the capacitors 52B and 53B, and supplies the cathode voltage to the cathode unit 90.

In addition, in this embodiment, the ratio of the number of turns of the secondary coil 51$B_2$ to the number of turns of the primary coil 51$B_1$ in the cathode transformer 50B is higher than the ratio of the number of turns of the secondary coil 51$A_2$ to the number of turns of the primary coil 51$A_1$ in the anode transformer 50A. In other words, the turn ratio of the cathode transformer 50B is higher than the turn ratio of the anode transformer 50A. That is, the degree of boosting of the cathode transformer 50B is larger than that of the anode transformer 50A. Further, in this embodiment, the capacitances of the capacitors 52B and 53B of the cathode-side booster circuit unit 63B are higher than the capacitances of the capacitors 52A and 53A of the anode-side booster circuit unit 63A. Therefore, the capacitors 52B and 53B of the cathode-side booster circuit unit 63B can accumulate a larger amount of charge than the capacitors 52A and 53A of the anode-side booster circuit unit 63A.

Since the cathode unit 90 emits electrons as described above, it is preferable that the cathode voltage supplied to the cathode unit 90 is larger than the anode voltage. As described above, since the turn ratio of the cathode transformer 50B is higher than that of the anode transformer 50A, it is possible to generate a cathode voltage that is larger than the anode voltage. Since the capacitances of the capacitors 52B and 53B of the cathode-side booster circuit unit 63B are higher than those of the capacitors 52A and 53A of the anode-side booster circuit unit 63A, it is possible to stably supply a cathode voltage that is larger than the anode voltage to the cathode unit 90.

As described above, in the radiation tube 60 according to this embodiment, in a case in which the cathode voltage is supplied to the cathode unit 90 and the anode voltage is applied to the anode unit 74, a tube current corresponding to the Zener voltage of the Zener diode 80 is generated, and the radiation R corresponding to the tube current is generated. In addition, the cathode voltage has a negative potential, and the anode voltage has a positive potential.

Further, in the radiation tube 60 according to this embodiment, the constant voltage supply unit 70 supplies a constant voltage as the driving voltage for driving the gate electrode 96. Therefore, it is possible to stabilize the gate voltage supplied to the gate electrode 96. It is possible to stabilize the amount of radiation R generated by the radiation tube 60.

Hereinafter, configuration examples of the constant voltage supply unit 70 and the electron emitting unit 72 according to this embodiment will be further described.

Configuration Example 1

Figure 4:
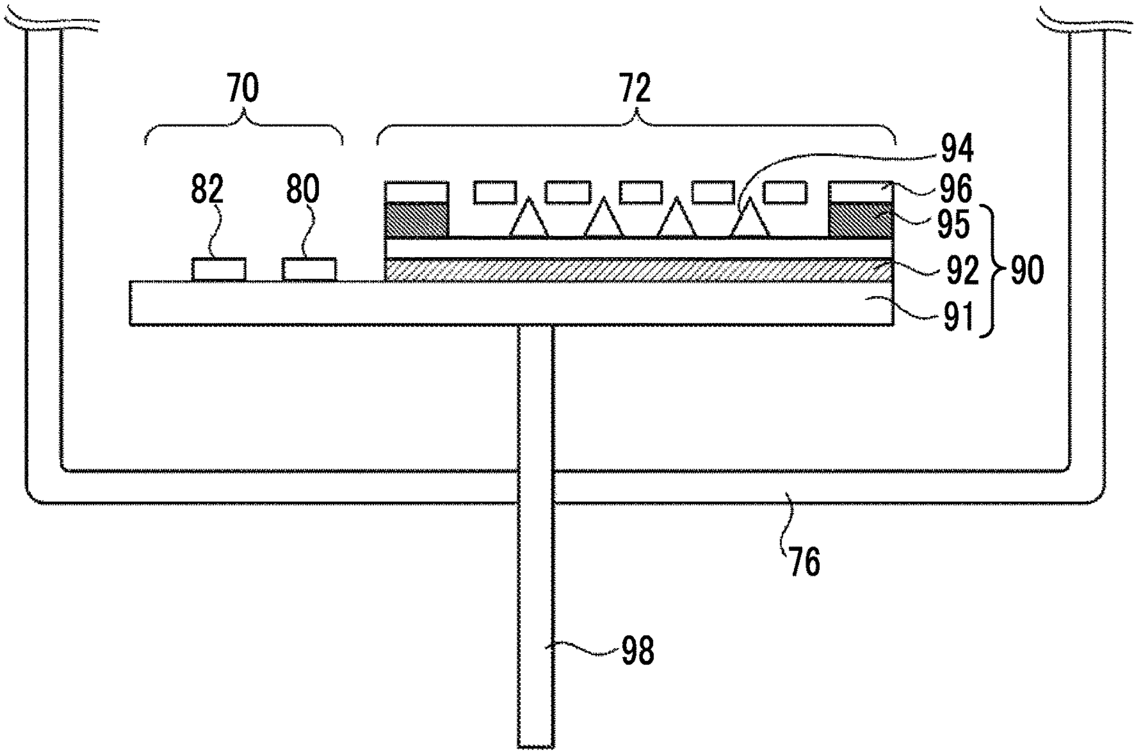
FIG. 4 is a diagram illustrating an outline of an example of a configuration of a cathode unit and a constant voltage supply unit according to Configuration Example 1.

FIG. 4 is a cross-sectional view illustrating the constant voltage supply unit 70 and the electron emitting unit 72 according to this configuration example. The constant voltage supply unit 70 and the electron emitting unit 72 according to this configuration example are mounted on the same substrate and are formed as a so-called one chip. In the example illustrated in FIG. 4, the Zener diode 80 and the temperature compensation diode 82 of the constant voltage supply unit 70 are mounted on the support substrate 91 of the cathode unit 90. The Zener diode 80 and the temperature compensation diode 82 can be formed as surface-mounted components on the support substrate 91 similarly to the cathode unit 90. Therefore, as in the aspect illustrated in FIG. 4, the electron emitting unit 72, the Zener diode 80, and the temperature compensation diode 82 may be integrated into one chip. In addition, in some cases, it is difficult to integrate the smoothing capacitor 84 of the constant voltage supply unit 70 and the electron emitting unit 72 into one chip, which is not illustrated in FIG. 4. Therefore, the smoothing capacitor 84 and the electron emitting unit 72 may not be integrated into one chip. That is, it is not necessary to mount the smoothing capacitor 84 on the support substrate 91. In this case, the smoothing capacitor 84 can be disposed at any position. For example, the smoothing capacitor 84 may be formed on a substrate different from the support substrate 91, which will be described in the following Configuration Examples 2 and 3.

As described above, in the radiation tube 60 according to this configuration example, the constant voltage supply unit 70 and the electron emitting unit 72 are mounted on the same substrate. In other words, in the radiation tube 60 according to this configuration example, the constant voltage supply unit 70 and the electron emitting unit 72 are integrated into one chip. Therefore, according to the radiation tube 60 of this configuration example, it is possible to reduce the size of the radiation tube 60. Further, it is possible to manufacture the constant voltage supply unit 70 and the electron emitting unit 72 at the same time and thus to improve the manufacturing yield.

Configuration Example 2

Figure 5:
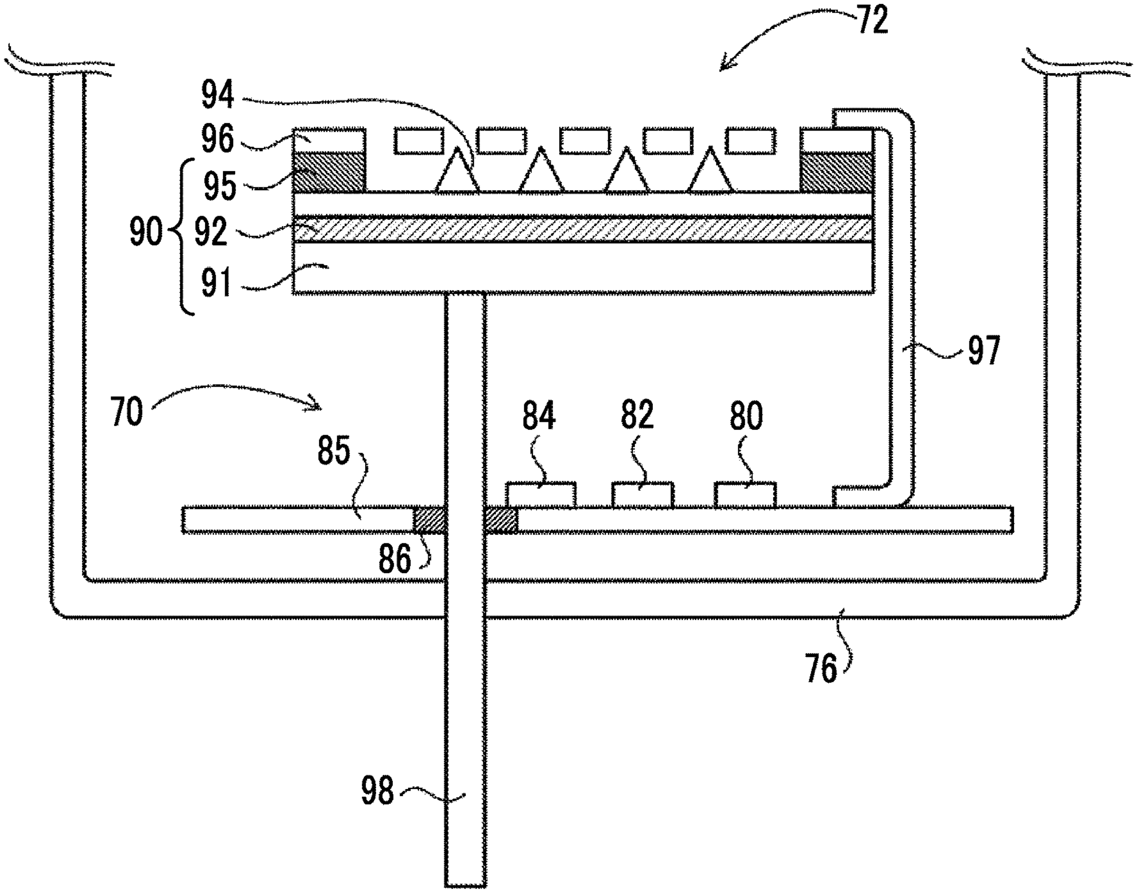
FIG. 5 is a diagram illustrating an outline of an example of a configuration of a cathode unit and a constant voltage supply unit according to Configuration Example 2.

FIG. 5 is a cross-sectional view illustrating the constant voltage supply unit 70 and the electron emitting unit 72 according to this configuration example. The constant voltage supply unit 70 and the electron emitting unit 72 according to this configuration example are formed on separate substrates. In addition, in the radiation tube 60, a substrate on which the constant voltage supply unit 70 is formed and a substrate on which the electron emitting unit 72 is formed are provided so as to be separated from each other. In the example illustrated in FIG. 5, the support substrate 91 on which the cathode unit 90 of the electron emitting unit 72 is formed and a constant voltage substrate 85 on which the constant voltage supply unit 70 is formed are provided so as to be separated from each other. Specifically, the constant voltage substrate 85 is provided so as to face a surface opposite to the surface on which the electron emitting element 94 is formed in the support substrate 91 of the cathode unit 90. A stem pin 98 for supplying the cathode voltage to the cathode unit 90 passes through the constant voltage substrate 85. An insulating material 86 is provided in a portion of the constant voltage substrate 85 through which the stem pin 98 passes. In addition, the electron emitting element 94 and the constant voltage substrate 85 are connected by a gate line 97, and a driving voltage is supplied from the constant voltage supply unit 70 to the constant voltage substrate 85 through the gate line 97.

As described above, in the radiation tube 60 according to this configuration example, the constant voltage supply unit 70 and the electron emitting unit 72 are formed on separate substrates, and the substrate on which the constant voltage supply unit 70 is formed and the substrate on which the electron emitting unit 72 is formed are provided so as to be separated from each other. In a case in which the constant voltage supply unit 70 and the electron emitting unit 72 are integrated into one chip as in Configuration Example 1 and a defect occurs in either the constant voltage supply unit 70 or the electron emitting unit 72, the entire chip is defective. In contrast, according to the radiation tube 60 of this configuration example, the constant voltage supply unit 70 and the electron emitting unit 72 are formed on separate substrates. Therefore, for example, in a case in which a defect occurs in either the constant voltage supply unit 70 or the electron emitting unit 72, only the unit with the defect may be replaced. Further, according to the radiation tube 60 of this configuration example, it is possible use the existing constant voltage supply unit 70 and electron emitting unit 72. Therefore, according to the radiation tube 60 of this configuration example, it is possible to improve the manufacturing yield and to suppress a manufacturing cost.

Configuration Example 3

Figure 6A:
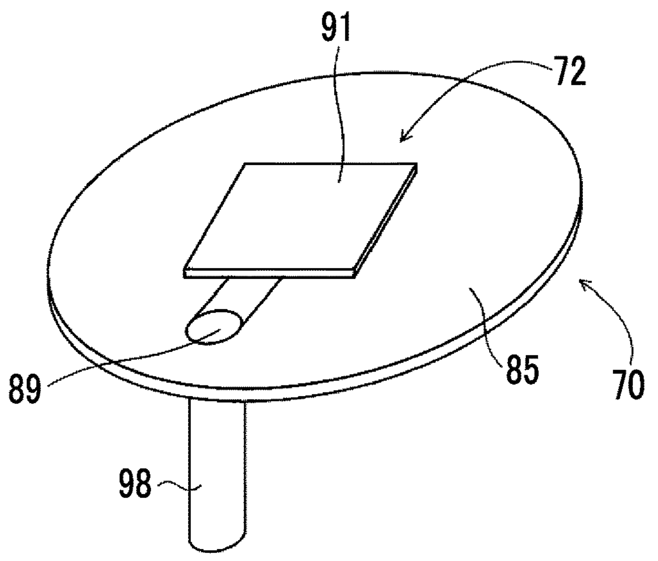
FIG. 6A is a perspective view illustrating an example of a constant voltage substrate of a constant voltage supply unit and a support substrate of an electron emitting unit according to Configuration Example 3.
Figure 6B:
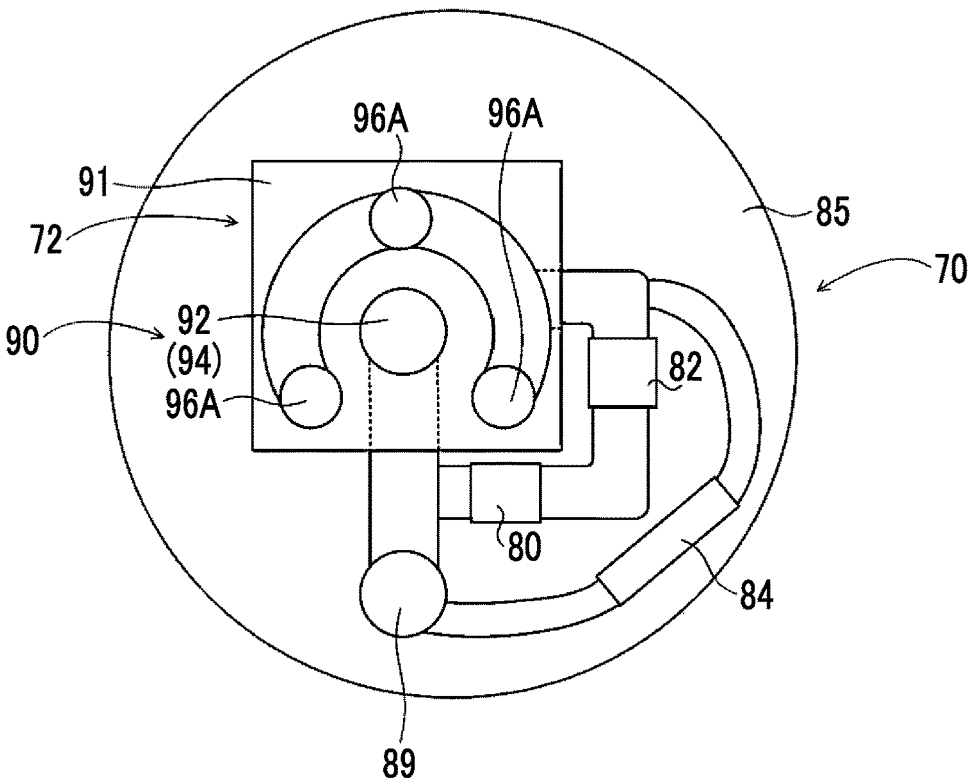
FIG. 6B is a plan view illustrating an example of the constant voltage supply unit and the electron emitting unit according to Configuration Example 3.

FIG. 6A is a perspective view illustrating the constant voltage substrate 85 of the constant voltage supply unit 70 and the support substrate 91 of the electron emitting unit 72 in this configuration example. In addition, in FIG. 6A, each element of the constant voltage supply unit 70 and each element of the electron emitting unit 72 are not illustrated. Further, FIG. 6B is a plan view illustrating the constant voltage supply unit 70 and the electron emitting unit 72 according to this configuration example. Similarly to the above-described Configuration Example 2, the constant voltage supply unit 70 and the electron emitting unit 72 according to this configuration example are formed on separate substrates. Further, unlike the above-described Configuration Example 2, in the radiation tube 60, the constant voltage substrate 85 on which the constant voltage supply unit 70 is formed and the support substrate 91 on which the electron emitting unit 72 is formed are provided so as to come into contact with each other. In the example illustrated in FIG. 6A, the support substrate 91 of the electron emitting unit 72 is provided on the constant voltage substrate 85 of the constant voltage supply unit 70 so as to come into contact with the constant voltage substrate 85.

FIG. 6B illustrates a gate pattern 96A for applying a gate voltage in the support substrate 91 of the electron emitting unit 72. The emitter electrode 92 provided with the electron emitting element 94 is provided in the vicinity of the gate pattern 96A, and electrons are emitted from the emitter electrode 92. Further, FIG. 6B illustrates the Zener diode 80, the temperature compensation diode 82, and the smoothing capacitor 84 on the constant voltage substrate 85 of the constant voltage supply unit 70. Furthermore, a cathode voltage application unit 89 to which the stem pin 98 is connected is provided on the constant voltage substrate 85. The cathode voltage application unit 89 is connected to the Zener diode 80 and the smoothing capacitor 84 of the constant voltage supply unit 70 and is connected to the cathode unit 90 of the electron emitting unit 72.

As described above, in the radiation tube 60 according to this configuration example, the constant voltage supply unit 70 and the electron emitting unit 72 are formed on separate substrates, and the substrate on which the constant voltage supply unit 70 is formed and the substrate on which the electron emitting unit 72 is formed are provided so as to come into contact with each other. Similarly to the radiation tube 60 according to Configuration Example 2, in the radiation tube 60 according to this configuration example, the constant voltage supply unit 70 and the electron emitting unit 72 are formed on separate substrates. Therefore, it is possible to improve the manufacturing yield and to suppress the manufacturing cost, as compared to a case in which the constant voltage supply unit 70 and the electron emitting unit 72 are integrated into one chip. In addition, according to the radiation tube 60 of this configuration example, the constant voltage supply unit 70 and the electron emitting unit 72 are provided so as to come into contact with each other. Therefore, it is possible to shorten wiring lines for electrically connecting the constant voltage supply unit 70 and the electron emitting unit 72 and to suppress a bad electrical connection. Further, according to the radiation tube 60 of this configuration example, it is possible to reduce the size of the radiation tube 60.

As described above, the radiation tube 60 of the mammography apparatus 10 according to the above-described embodiment is used in a radiation source for radiography and comprises: the electron emitting unit 72 that includes the cathode unit 90 having the emitter electrode 92 which emits electrons and the gate electrode 96; the anode unit 74 that has the anode surface 75 facing the cathode unit 90 and collides with the electrons to generate the radiation R; the constant voltage supply unit 70 that supplies a constant driving voltage to the gate electrode 96; and the vacuum tube 76 that accommodates the constant voltage supply unit 70, the electron emitting unit 72, and the anode unit 74.

The housing 64 accommodating the radiation tube 60 has the ground potential as illustrated in FIG. 2. Therefore, unlike the above-described embodiment, in the aspect according to the related art in which a constant voltage circuit for supplying a constant driving voltage to the gate electrode 96 of the electron emitting unit 72 is provided outside the vacuum tube, it is necessary to provide the housing 64 and the constant voltage circuit so as to be sufficiently separated from each other. Therefore, in a case in which the constant voltage circuit is provided outside the vacuum tube, it is necessary to increase the size of the housing 64. In contrast, in the radiation tube 60 according to the above-described embodiment, the constant voltage supply unit 70 and the electron emitting unit 72 are accommodated in the vacuum tube 76. Therefore, even in a case in which the space between the housing 64 and the vacuum tube 76 is narrower than that in the related art, the housing 64 and the constant voltage supply unit 70 can be provided so as to be sufficiently separated from each other.

As a result, according to the radiation tube 60 of the mammography apparatus 10 according to the above-described embodiment, the radiation source 29 comprising the radiation tube 60 can be smaller than that in the related art.

In the above-described embodiment, the aspect in which the constant voltage supply unit 70 uses the Zener diode 80 has been described. However, the specific configuration of the constant voltage supply unit 70 is not limited to this aspect. The constant voltage supply unit 70 may have any configuration as long as it can supply a constant driving voltage to the gate electrode 96.

In addition, in the above-described embodiment, the aspect in which the constant voltage substrate 85 of the constant voltage supply unit 70 is accommodated in the vacuum tube 76 has been described. However, the present disclosure is not limited to this aspect. The constant voltage substrate 85 may protrude out of the vacuum tube 76.

Further, in the above-described embodiment, the aspect in which the technology of the present disclosure is applied to the radiation tube 60 and the radiation source 29 of the mammography apparatus 10 has been described. However, the technology of the present disclosure may be applied to radiation tubes and radiation sources of radiography apparatuses other than the mammography apparatus 10. For example, the technology of the present disclosure may be applied to radiation tubes and radiation sources of radiography apparatuses in which the object is the chest, the abdomen, or the like.

What is claimed is:

1. A radiation tube that is used in a radiation source for radiography, the radiation tube comprising:

an electron emitting unit that includes a cathode unit having an emitter electrode which emits electrons and a gate electrode;

an anode unit that has an anode surface facing the cathode unit and collides with the electrons to generate x-ray radiation;

a constant voltage supply unit that supplies a constant driving voltage to the gate electrode; and a vacuum tube that accommodates the electron emitting unit, the anode unit, and the constant voltage supply unit;

wherein the constant voltage supply unit includes a Zener diode that is connected in parallel to the gate electrode and the cathode unit and a smoothing capacitor that is connected in parallel to the Zener diode.

2. The radiation tube according to claim 1, wherein at least the Zener diode of the constant voltage supply unit is mounted on the same substrate as the electron emitting unit.

3. The radiation tube according to claim 1, wherein a constant voltage substrate on which the constant voltage supply unit is formed is disposed to come into contact with an electron emitting unit substrate on which the electron emitting unit is formed.

4. The radiation tube according to claim 1, wherein a constant voltage substrate on which the constant voltage supply unit is formed is disposed to be separated from an electron emitting unit substrate on which the electron emitting unit is formed.

5. A radiation source comprising:

the radiation tube according to claim 1;

an anode-side booster circuit unit that is provided outside the vacuum tube of the radiation tube and supplies a boosted anode voltage to the anode unit; and a cathode-side booster circuit unit that is provided outside the vacuum tube and supplies a boosted cathode voltage to the cathode unit.

6. The radiation source according to claim 5, wherein a degree of boosting by the cathode-side booster circuit unit is larger than a degree of boosting by the anode-side booster circuit unit.

7. The radiation source according to claim 6, wherein the anode-side booster circuit unit includes an anode transformer, and the cathode-side booster circuit unit includes a cathode transformer that has a higher ratio of the number of turns of a secondary coil to the number of turns of a primary coil than the anode transformer.

8. The radiation source according to claim 6, wherein the anode-side booster circuit unit includes an anode capacitor that accumulates charge corresponding to the boosted power supply voltage, and the cathode-side booster circuit unit includes a cathode capacitor that accumulates charge corresponding to the boosted driving voltage and has a higher capacitance than the anode capacitor.

9. The radiation source according to claim 5, further comprising:

a housing that accommodates the radiation tube.

* * * * *